United States Patent
Staniulis, Jr.

(10) Patent No.: US 11,299,606 B1
(45) Date of Patent: Apr. 12, 2022

(54) REINFORCED POLYMER-BASED COMPOUND

(71) Applicant: Anthony Staniulis, Jr., Las Vegas, NV (US)

(72) Inventor: Anthony Staniulis, Jr., Las Vegas, NV (US)

( * ) Notice: Subject to any disclaimer, the term of this patent is extended or adjusted under 35 U.S.C. 154(b) by 0 days.

(21) Appl. No.: 17/395,490

(22) Filed: Aug. 6, 2021

(51) Int. Cl.
*C08L 23/06* (2006.01)
*C09K 21/14* (2006.01)
*C09K 21/02* (2006.01)
*F25D 23/08* (2006.01)
*C09K 21/12* (2006.01)

(52) U.S. Cl.
CPC .............. *C08L 23/06* (2013.01); *C09K 21/02* (2013.01); *C09K 21/12* (2013.01); *C09K 21/14* (2013.01); *F25D 23/087* (2013.01); *C08L 2201/02* (2013.01); *C08L 2201/08* (2013.01); *C08L 2207/062* (2013.01)

(58) Field of Classification Search
None
See application file for complete search history.

(56) References Cited

U.S. PATENT DOCUMENTS

| | | | | |
|---|---|---|---|---|
| 3,819,550 | A * | 6/1974 | Riccitiello | C08J 9/02 521/189 |
| 6,931,883 | B2 * | 8/2005 | Bourne | F24F 5/0035 62/314 |
| 2005/0197440 | A1 * | 9/2005 | Chen | D01F 6/62 524/440 |
| 2010/0016459 | A1 * | 1/2010 | Cernohous | C08K 3/346 521/146 |
| 2017/0301968 | A1 * | 10/2017 | Cooney | C09D 5/00 |
| 2018/0230291 | A1 * | 8/2018 | Albertelli | C08L 75/04 |
| 2020/0239689 | A1 * | 7/2020 | Seliskar | C08L 53/025 |
| 2021/0139784 | A1 * | 5/2021 | Kasowski | C08L 77/00 |
| 2021/0214538 | A1 * | 7/2021 | Nakao | A61J 1/10 |

* cited by examiner

*Primary Examiner* — Robert T Butcher
(74) *Attorney, Agent, or Firm* — Bayramoglu Law Offices LLC

(57) ABSTRACT

A reinforced polymer-based compound comprises a base material, and at least one of a reactive flame-retardant material, an additive flame retardant material, an intumescent material coating, an antimicrobial agent, an ultraviolet light stabilizer and a ceramic coating, wherein the reinforced polymer-based compound is configured to withstand a first temperature range.

19 Claims, No Drawings

REINFORCED POLYMER-BASED COMPOUND

TECHNICAL FIELD

The present disclosure relates to the field of polymer compounds. More specifically, the present disclosure relates to a reinforced polymer-based compound.

BACKGROUND

Various equipment is installed on the outside and/or the inside of residential and commercial buildings. Such equipment will be used for a long time, sometimes for years. Most of the equipment located outside and/or inside the building structure are used to provide utilities to the building. Such equipment located outside and/or inside the building structure generally use water and electricity for operation. Amongst them are coolers which provide cool air by converting hot dry air through an evaporative process. This evaporative process works by forcing warm air through fluidly moist heat exchange pads to remove the hot dry air's heat and then injects cooled moist air into a desired space.

However, the equipment that are located outside and/or inside the building structures have disadvantages and problems. For example, equipment outside and/or inside the building structures, which use water for operation, are prone to quickly forming mold, mildew, having calcination and forming deposits of metals and/or minerals, due to the water being evaporated, on all metal and/or non-porous internal surfaces of the equipment since water, including hard water, being distributed through metal or plastic tubing, contacting all internal surfaces of the equipment. Due to the mold and mildew problems of the equipment, a smell and associated problems with air quality is introduced into the building, house or other enclosed area to which the equipment located outside and/or inside the building structure air is to be introduced. These deposits of mold, mildew, calcination, metals and minerals reduce the efficiency of the equipment located outside and/or inside the building structure and reduces the useful life of the equipment located outside and/or inside the building structure overtime. For example, the formations of mold, mildew, calcination, metals and minerals onto the inner surfaces of the cooler located outside and/or inside the building structure reduce the effective cooling passage flow areas within the heat exchangers and form a thermal barrier layer within the cooling passages of the heat exchangers and therefore reduces the cooling efficiency of the heat exchangers and further increases the operational cost of the cooler by having to input more electrical energy such as more power to the fan(s) and pump(s) in order to run the fan(s) and pumps(s) at higher speeds to compensate for the reduced cooling efficiency caused by the buildup of mold, mildew, calcination and deposits of metals and minerals onto the inner surface of the cooler. Furthermore, frequent cleaning is required on conventional equipment located outside and/or inside the building structure to avoid these problems which significantly increase the operating costs to the owner of the equipment located outside and/or inside the building structure as well as creating frequent hazardous preventive maintenance due to most equipment located outside and/or inside the building structure being positioned/mounted on the roof of a building which may even make maintenance and cleaning impossible in certain weather events and conditions. Moreover, the equipment located outside and/or inside the building structure is exposed to direct sunlight during the day, which can damage the cooler over time. This damage is exacerbated during the summer days and in warm areas.

Therefore, there is a need to avoid damage caused by the above-mentioned factors to equipment located outside and/or inside the building structures to save energy, and to maintain the equipment in an efficient, low cost and low maintenance manner.

Applicant has solved the above problems by covering and/or fabricating such equipment with a reinforced polymer-based compound which protects the equipment from the damages noted above.

The present disclosure and invention have solved the problem of preventing mold, mildew, calcination and deposits of metals and minerals forming on the inner surface of the equipment located outside and/or inside the building structure by covering and/or fabricating the equipment located outside and/or inside the building structure with a reinforced polymer-based compound, made from and/or comprise a non-porous material such as high-density polyethylene (HDPE). If desired, only a portion or portions of the outside surface or surfaces of the equipment located outside and/or inside the building structure, except for, for example, the surfaces of the indirect heat exchanger pads in case of a cooler, is/are covered and/or fabricated by a non-porous material such as high-density polyethylene (HDPE). It should be noted that, the pads may also be covered and/or fabricated by the non-porous material such as high-density polyethylene (HDPE). However, it is best and preferred if all of the outside surfaces of the equipment located outside and/or inside the building structure are covered by and/or fabricated from the non-porous material such as high-density polyethylene (HDPE). Therefore, the present disclosure includes all of the outside surfaces of the equipment located outside and/or inside the building structure, covered by and/or fabricated from the non-porous material such as high-density polyethylene (HDPE) which prevents the formation of mold, mildew, calcination and deposits of metals and minerals on the surfaces of the equipment located outside and/or inside the building structure and therefore increases the performance efficiency and the operational life of the equipment located outside and/or inside the building structure as well as lowers the cost of operating and maintenance of the equipment located outside and/or inside the building structure.

SUMMARY

The present disclosure describes an equipment located outside and/or inside the building structure covered and/or fabricated with a reinforced polymer-based compound. All surfaces of the equipment located outside and/or inside the building structure are covered and/or fabricated by a non-porous material such as high-density polyethylene (HDPE)-based compound which prevents the formation of mold, mildew, calcination and deposits of metals and minerals from forming on the surfaces of the equipment located outside and/or inside the building structure. The non-porous surfaces can be made by known methods of manufacturing as well as molding, coating or 3-D printing.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV)

stabilized, will not delaminate, chip, rot, or swell, is easy to machine with standard tooling, is a low energy material and has no moisture absorption, is easy to clean and is FDA and USDA approved with UV additive. The thickness used on all surfaces of the equipment that is covered and/or fabricated with the reinforced polymer-based compound (such as a cooling tower, heat exchangers, tubing or any equipment made to contact or transfer fluids) is in the range of one sixteenth of an inch to six inches. Although the equipment that is covered and/or fabricated with the reinforced polymer-based compound could be any suitable equipment, for sake of simplicity, a cooling tower is used as a non-limiting example below. The above characteristics and benefits are needed and required to make the disclosed cooling tower prevent the formation of mold, mildew, calcination and deposits of metals, prevent thermal warping and increase the cooling efficiency during the operational life of the cooling tower and the evaporative cooling system.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than $0.944$ $g/cm^3$, medium density polyethylene (MDPE) having a density in the range of $0.926$ $g/cm^3$ to $0.940$ $g/cm^3$, low density polyethylene (LDPE) having a density in the range of $0.910$ $g/cm^3$ to $0.925$ $g/cm^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention uses on all inside surfaces of the cooling tower, except for the surfaces of the indirect heat exchanger pads, high-density polyethylenes. It should be noted that, the pads may also be covered by and/or fabricated from the non-porous material such as high-density polyethylene (HDPE). However, polypropylenes and ionomers having the density of the range of HPDE, may be used on all inside surfaces of the cooling tower, except for the surfaces of the indirect heat exchanger pads. It should be noted that, the pads may also be covered by and/or fabricated from the non-porous material such as high-density polyethylene (HDPE). If desired, only a portion or portions of the inside surface or surfaces of the cooling tower, except for the surfaces of the indirect heat exchanger pads, is/are made from and/or comprise a non-porous material such as high-density polyethylene (HDPE). However, it is best and preferred if all inside surfaces of the cooling tower, except for the surfaces of the indirect heat exchanger pads, are made from and/or comprise a non-porous material such as high-density polyethylene (HDPE) and not made from metal.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such as being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used in cooling towers which are exposed to water due to the HDPE resisting mold and mildew which results in low maintenance and very low frequent cleaning of the cooling tower as compared to conventional cooling towers. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

In addition to the polymer-based component, the reinforced polymer-based compound includes an additive component. The additive component may include at least one of: a flame-retardant material, an intumescent material and/or coating, an antimicrobial agent, an ultraviolet light stabilizer, and a ceramic coating.

The reinforced polymer-based compound which includes at least one of the above additive components is used to make heat exchangers, tubes, tubing, conduits, coils, fins (i.e. fins which transfer heat), cabinets, floors, counter tops, walls, stairs, windows frames, molding, coating or lining inside and/or outside of all types of tubes, conduits, coils and heat exchangers, as well as marine products such as boat hulls, decks, floors, cabinets, counter tops, walls, frames and molding. The coating or lining inside and/or outside of all types of tubes, conduits, coils and heat exchangers can be performed by processes such as dipping and spraying or any other know functionally equivalent method of coating. Also, the process of friction fitting can use used to connect all types of tubes, conduits and coils made from the reinforced polymer-based compound which includes at least one of the above additive together with other elements or parts which are made from or not made from the reinforced polymer-based compound which includes at least one of the above additive.

The ceramic coating prevents dust and dirty and other elements from sticking to or collection on the surface of the reinforced polymer-based compound and also prevents scale from forming on the surface of the reinforced polymer-based compound and improves the heat transfer efficiency of a device made form the reinforced polymer-based compound by the prevention of scale forming on the surface of the reinforced polymer-based compound and the prevention of dust and dirt from collecting on the surface of the reinforced polymer-based compound.

The flame-retardant material is from 0.1% by weight up to 30% by weight of the polymer-based component or HDPE. The intumescent material and/or coating is from 0.1% by weight up to 30% by weight of the polymer-based component or HDPE. The antimicrobial agent is from 0.1% by weight up to 15% by weight of the polymer-based component or HDPE. The ultraviolet light stabilizer is from 0.1% by weight up to 5% by weight of the polymer-based component or HDPE. However, each of the above additive components (i.e. flame-retardant material, intumescent material and/or coating, antimicrobial agent, and ultraviolet light stabilizer) may have a value lower than the above disclosed range or have a value larger than the above disclosed range. If all or more than one of the above additive components are added to the reinforced polymer-based compound or HDPE, then the total additive percentage weight of the additive components should not exceed eighty percent weight of the reinforced polymer-based compound or HDPE.

The flame retardant materials are generally resistant to degradation at high temperatures. The flame retardant may be a polymer. The flame retardant polymer may naturally exhibit an intrinsic resistance to decomposition. Alternatively, the flame retardant polymer may be synthesized by incorporating flame-resistant additives and fillers, such as melamine, fumed silica, alumina trihydrate, calcium carbonate, stearates, and glass, ceramic, or thermoplastic microspheres. The flame retardant polymer may be made by modifying various properties of the polymers such as ease of ignition, rate of heat release, and the evolution of smoke and toxic gases.

The polymers that are most efficient at resisting combustion are the polymers that are synthesized as intrinsically flame-retardant. Modifying different properties of the polymers can increase their intrinsic flame retardant properties; increasing rigidity or stiffness, the use of polar monomers, and/or hydrogen bonding between the polymer chains can all enhance flame retardant properties. Most intrinsically flame retardant polymers are made by incorporation of aromatic cycles or heterocycles, which lend rigidity and stability to the polymers. Polyimides, polybenzoxazoles (PBOs), polybenzimidazoles, and polybenzthiazoles (PBTs) are examples of polymers made with aromatic heterocycles. Polymers made with aromatic monomers have a tendency to condense into chars upon combustion, decreasing the amount of flammable gas that is released.

Inorganic and semi-organic polymers may be used as the additive component, which often employ silicon-nitrogen, boron-nitrogen, and phosphorus-nitrogen monomers. The non-burning characteristics of the inorganic components of these polymers contribute to their controlled flammability. For example, HDPE-polysilanes (Si—Si bonds), HDPE-polysiloxanes (Si—O bonds, or silicones), HDPE-polysilazanes (Si—N bonds), HDPE-polysulfides (S—S bonds), HDPE-polyphosphazenes (P—N bonds), HDPE-polyborazylenes (B—N bonds), and HDPE-polythiazyls (S—N bonds) can be used as inorganic and semi-organic polymers.

The additive component may be a flame retardant. Depending on the interaction of the additive and polymer, the additive component may be a reactive flame retardant (such as Tetrabromobisphenol A), or an additive flame retardant. Additive flame retardant (such as halogenated flame retardant) is added to the polymer through physical mixing, does not bind to the polymer chemically (i.e., does not undergo any chemical reactions, and can be incorporated into the polymeric mixture at any stage of manufacturing. On the other hand, reactive flame retardant is added to the polymer via chemical reactions, once incorporated becomes a permanent part of the polymeric structure (i.e., bind chemically) and must be incorporated only during the early stages of manufacturing.

The additive component of the reinforced polymer-based compound may be a natural fiber (such as cotton, jute, and silk), which provide satisfactory mechanical properties and renewability, and are more environmentally friendly. Additionally, the additive component of the reinforced polymer-based compound may be nanocomposites, such as nano-dispersed montmorillonite clay in the polymer matrix, organo-modified clays, TiO2 nanoparticles, silica nanoparticles, layered double hydroxides, carbon nanotubes, and combinations of nanoparticles with traditional fire retardants (e.g., intumescent) or with surface treatment (e.g., plasma treatment).

The additive component of the reinforced polymer-based compound may be an intumescent material (e.g., water-proofed sodium silicate, or graphite). An intumescent is a substance that swells as a result of heat exposure, thus leading to an increase in volume and decrease in density. Intumescents are typically used in passive fire protection and require listing, approval, and compliance in their installed configurations in order to comply with the national building codes and laws.

The intumescent may be an ablative coating which contains a significant amount of hydrates. When the hydrates are heated, the hydrates decompose, and water vapor is released, which has a cooling effect. Once the water is spent, the insulation characteristics of the char that remains can slow down heat transfer from the exposed side to the unexposed side of the reinforced polymer-based compound. Hard chars can be produced with sodium silicates and graphite. The flame retarding polymers by intumescence is essentially a special case of a condensed phase mechanism which was disclosed above. The activity occurs in the condensed phase and radical trap mechanism in the gaseous phase appears to not be involved. In intumescence, the amount of fuel produced is also greatly diminished and char rather than combustible gases is formed. The intumescent char, however, has a special active role in the process. The intumescent char constitutes a two-way barrier, both for the hindering of the passage of the combustible gases and molten polymer to the flame as well as the shielding of the polymer from the heat of the flame.

The flame retardant material may be a melamine-based flame retardants which is cost effectiveness, has low smoke density and toxicity, and has low corrosion. In this family of non-halogenated flame retardants, three chemical groups can be distinguished: 1—pure melamine, 2—melamine derivatives, i.e., salts with organic or inorganic acids such as boric acid, cyanuric acid, phosphoric acid or pyro/poly-phosphoric acid, and 3—melamine homologues such as melam, melem and melon. Melamine based flame retardants show excellent flame retardant properties and versatility in use because of their ability to employ various modes of flame retardant action.

The flame retardant material may be a silicon-based flame retardant (e.g., polydimethylsiloxane). Low levels of silicon in certain organic polymer systems improves their Limiting Oxygen Index (LOI) and the standard for safety of flammability of plastic materials for parts in devices and appliances testing (known as UL-94) performance. Silicon compounds such as polydimethylsiloxane-type contain dry powders with a variety of organic plastics.

The additive component of the reinforced polymer-based compound may include an antimicrobial agent. The antimicrobial agent may be an organometallic, an isothazolone, an organosulfur, and a mercaptan. The antimicrobial agent impedes and/or limits the growth of organisms typically encountered in cold and/or wet conditions, including bacteriostatic and fungistatic compounds. Optionally, the additive component of the reinforced polymer-based compound may include an antioxidant such as a phenolic. The additive component of the reinforced polymer-based compound may include a mold release agent, such as a fine-particle or powdered solid, a soap, a wax, a silicone, a polyglycol and complex ester such as trimethylolpropane tri-stearate or pentaerythritol tetra-stearate. The additive component of the reinforced polymer-based compound may include a heat stabilizer, such as an organotin mercaptide, an octyl ester of thioglycolic acid and a barium or cadmium carboxylate.

The additive component of the reinforced polymer-based compound may include an ultraviolet light stabilizer, such as a hindered amine, a salicylate, a cyanoacrylate, and a nickel chelate.

Depending on the size and shape of the equipment located outside and/or inside the building structure, the reinforced polymer-based compound is formed in the general shape of a square or box shaped or rectangular shaped. As an example, the reinforced polymer-based compound may be formed to have a height in the range of two feet to twelve feet; a width in the range of two feet to twelve feet; and a depth in the range of two feet to twelve feet. As needed, the above height, width and depth ranges of reinforced polymer-based compound may be smaller and/or larger than the above disclosed ranges in order to meet design and demands. However, the shape of the reinforced polymer-based compound can be any geometrical or polygonal shape.

The ambient air surrounding the reinforced polymer-based compound usually is in the range of −30° F. to 200° F. in the daytime. Additionally, the ambient air surrounding the reinforced polymer-based compound usually is in the range of 10° F. to 90° F. in the nighttime.

DETAILED DESCRIPTION

The technical solutions of the present disclosure will be clearly and completely described below. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

Disclosed reinforced polymer-based compound includes a base component, and an additive component. The base component may be a high density polyethylene (HDPE).

All of the outside surfaces of the equipment located outside and/or inside of a building structure are covered and/or fabricated with the reinforced polymer-based compound which is a non-porous material. The reinforced polymer-based compound can be made by any suitable methods of manufacturing as well as molding, coating or 3-D printing. Preferably, all of the outside surfaces of the equipment located outside and/or inside of the building structure are covered and/or fabricated with the reinforced polymer-based compound.

The base component includes High-density polyethylene (HDPE). HDPE or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness used on all surfaces of the cooling tower of the Marine Grade HDPE is in the range of one sixteenth of an inch to six inches. The above characteristics and benefits of the HDPE and the additive component are needed and required to make the disclosed reinforced polymer-based compound prevent the formation of mold and mildew, to minimize the adverse effect of sunlight, to resist against the adverse effect of water (such as rain and snow), to resist against fire and smoke, to promote public health by acting as an antimicrobial growth material, and to increase the efficiency of the equipment located outside and/or inside of the building structure during the operational life of the equipment.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm$^3$, medium density polyethylene (MDPE) having a density in the range of 0.926 g/cm$^3$ to 0.940 g/cm$^3$, low density polyethylene (LDPE) having a density in the range of 0.910 g/cm$^3$ to 0.925 g/cm$^3$, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(1-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

The disclosed invention covers all of outside surfaces of the equipment located outside and/or inside of the building structure, except for some surfaces, with the reinforced polymer-based compound. It should be noted that, some of the surfaces of the equipment, such as the surfaces of an indirect heat exchanger pad in a cooler, are not covered and/or being fabricated with the reinforced polymer-based compound which includes high-density polyethylene. However, polypropylenes and ionomers having the density of the range of HPDE, may be used on all outside surfaces of the equipment located outside and/or inside of the building structure, except for the surfaces of one indirect heat exchanger pad. If desired, only a portion or portions of the outside surface or surfaces of the equipment located outside and/or inside of the building structure, except for the surfaces of the one indirect heat exchanger pad, are covered and/or fabricated with the reinforced polymer-based compound. However, it is best and preferred if all outside surfaces of the equipment located outside and/or inside of the building structure, except for the surfaces of the indirect heat exchanger pads, are covered and/or fabricated with the reinforced polymer-based compound.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used as the base component in the reinforced polymer-based compound. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

The reinforced polymer-based compound includes an additive component. The additive component may include at least one of: a flame-retardant material, an intumescent material coating, an antimicrobial agent, an ultraviolet light stabilizer, and a ceramic coating.

The reinforced polymer-based compound which includes at least one of the above additive components is used to make heat exchangers, tubes, tubing, conduits, coils, fins (i.e. fins which transfer heat), cabinets, floors, counter tops, walls, stairs, windows frames, molding, coating or lining inside and/or outside of all types of tubes, conduits, coils and heat exchangers, as well as marine products such as boat hulls, decks, floors, cabinets, counter tops, walls, frames and molding. The coating or lining inside and/or outside of all types of tubes, conduits, coils and heat exchangers can be performed by processes such as dipping and spraying or any other know functionally equivalent method of coating. Also, the process of friction fitting can use used to connect all types of tubes, conduits and coils made from the reinforced polymer-based compound which includes at least one of the above additive together with other elements or parts which are made from or not made from the reinforced polymer-based compound which includes at least one of the above additive.

The ceramic coating prevents dust and dirty and other elements from sticking to or collection on the surface of the reinforced polymer-based compound and also prevents scale from forming on the surface of the reinforced polymer-based compound and improves the heat transfer efficiency of a device made form the reinforced polymer-based compound by the prevention of scale forming on the surface of the reinforced polymer-based compound and the prevention of dust and dirt from collecting on the surface of the reinforced polymer-based compound.

The additive component of the reinforced polymer-based compound may be a flame retardant. The flame retardant materials are generally resistant to degradation at high temperatures. The flame retardant may be a polymer. The flame retardant polymer may naturally exhibit an intrinsic resistance to decomposition. Alternatively, the flame retardant polymer may be synthesized by incorporating flame-resistant additives and fillers such as melamine, fumed silica, alumina trihydrate, calcium carbonate, stearates, and glass, ceramic, or thermoplastic microspheres. The flame retardant polymer may be made by modifying various properties of the polymers such as ease of ignition, rate of heat release, and the evolution of smoke and toxic gases. Standard methods for testing polymer flammability vary among countries. In the United States common fire tests include the UL 94 small-flame test, the ASTM E 84 Steiner Tunnel, and the ASTM E 622 National Institute of Standards and Technology (NIST) smoke chamber.

Traditionally, polymers decompose under heat and produce combustible products; thus, the polymers are generally able to originate and easily propagate fire. The combustion process begins when heating the polymer yields volatile products. If such products are sufficiently concentrated, within the flammability limits, and at a temperature above the ignition temperature, then combustion proceeds. As long as the heat supplied to the polymer remains sufficient to sustain the polymer's thermal decomposition at a rate exceeding that required to feed the flame, combustion will continue.

In order to make a flame retardant polymer, it is vital to control heat below the critical level. There are several approaches to achieve controlling the heat below the critical level including but not limited to, creating an endothermic environment, producing non-combustible products, or adding chemicals that would remove fire-propagating radicals (e.g., H and OH). The specific chemicals can be added into the polymer molecules permanently, or as additives and fillers.

Oxygen catalyzes the pyrolysis of polymers at low concentration and initiates oxidation at high concentration. Transition concentrations are different for different polymers. (e.g., polypropylene, between 5% and 15%). Additionally, polymers exhibit a structural-dependent relationship with oxygen. Some structures are intrinsically more sensitive to decomposition upon reaction with oxygen. The amount of access that oxygen has to the surface of the polymer also plays a role in polymer combustion. Oxygen is better able to interact with the polymer before a flame has actually been ignited. In most cases, results from a typical heating rate (e.g., 10° C./min for mechanical thermal degradation studies) do not differ significantly from those obtained at higher heating rates. The extent of reaction can, however, be influenced by the heating rate. For example, some reactions may not occur with a low heating rate due to evaporation of the products.

Volatile products are removed more efficiently under low pressure, which means the stability of the polymer might have been compromised. Decreased pressure also slows down decomposition of high boiling products.

The polymers that are most efficient at resisting combustion are the polymers that are synthesized as intrinsically flame-retardant. Modifying different properties of the polymers can increase their intrinsic flame retardant properties; increasing rigidity or stiffness, the use of polar monomers, and/or hydrogen bonding between the polymer chains can all enhance flame retardant properties. Most intrinsically flame retardant polymers are made by incorporation of aromatic cycles or heterocycles, which lend rigidity and stability to the polymers. Polyimides, polybenzoxazoles (PBOs), polybenzimidazoles, and polybenzthiazoles (PBTs) are examples of polymers made with aromatic heterocycles. Polymers made with aromatic monomers have a tendency to condense into chars upon combustion, decreasing the amount of flammable gas that is released. Syntheses of these types of polymers generally employ prepolymers which are further reacted to form the fire-resistant polymers.

The additive component of the reinforced polymer-based compound may be a ladder polymer. Ladder polymers are a subclass of polymers made with aromatic cycles or heterocycles. Ladder polymers generally have one of two types of general structures. One type of ladder polymer may link two polymer chains with periodic covalent bonds. In another type, the ladder polymer consists of a single chain that is double-stranded. Both types of ladder polymers exhibit good resistance to decomposition from heat because the chains do not necessarily fall apart if one covalent bond is broken.

The additive component of the reinforced polymer-based compound may be an inorganic or semi-organic polymer. Inorganic and semi-organic polymers often employ silicon-nitrogen, boron-nitrogen, and phosphorus-nitrogen monomers. The non-burning characteristics of the inorganic components of these polymers contribute to their controlled flammability. For example, instead of forming toxic, flammable gasses in abundance, polymers prepared with incorporation of cyclotriphosphazene rings give a high char yield upon combustion. Polysialates (polymers containing frameworks of aluminum, oxygen, and silicon) are another type of inorganic polymer that can be thermally stable up to temperatures of 1300-1400° C. For example, HDPE-polysilanes (Si—Si bonds), HDPE-polysiloxanes (Si—O bonds, or silicones), HDPE-polysilazanes (Si—N bonds), HDPE-polysulfides (S—S bonds), HDPE-polyphosphazenes (P—N bonds), HDPE-polyborazylenes (B—N bonds), and HDPE-polythiazyls (S—N bonds) can be used as inorganic and semi-organic polymers.

The additive component may be a flame retardant. Depending on the interaction of the additive and polymer, the additive component may be a reactive flame retardant (e.g., Tetrabromobisphenol A), or an additive flame retardant (e.g., a halogenated flame retardant). Reactive flame retardants are compounds that are chemically built into the polymer. The reactive flame retardant polymers usually contain heteroatoms. Additive flame retardants, on the other hand, are compounds that are not covalently bound to the polymer; the additive flame retardant and the polymer are just physically mixed together. Aluminum, phosphorus, nitrogen, antimony, chlorine, bromine, magnesium, zinc and carbon can be used as additive flame retardant.

Additive flame retardant (e.g., halogenated flame retardant) is added to the polymer through physical mixing, does not bind to the polymer chemically (i.e., does not undergo any chemical reactions), and can be incorporated into the polymeric mixture at any stage of manufacturing. On the other hand, reactive flame retardant (e.g., Tetrabromobisphenol A) is added to the polymer via chemical reactions, once incorporated becomes a permanent part of the polymeric structure (i.e., bind chemically) and must be incorporated only during the early stages of manufacturing.

Generally, the flame retardants act either in the gas phase where the flame retardant removes the high energy radicals H and OH from the flame or in the solid phase, where the flame retardant shields the polymer by forming a charred layer and thus protects the polymer from being attacked by oxygen and heat.

Fire is the result of three factors: heat, fuel and oxygen. Heat produces flammable gases from the pyrolysis of polymer. Then, an adequate ratio between these gases and oxygen leads to ignition of the polymer. The combustion leads to a production of heat that is spread out (delta H1) and fed back (delta H2). This heat feedback pyrolyses the polymer and keeps the combustion going.

To limit the establishment of the combustion circle, one, or several, ingredient has to be removed. Flame retardants inhibits or suppress the combustion process. Depending on the polymer and the fire safety test, flame retardants interfere into one or several stages of the combustion process: heating, decomposition, ignition, flame spread, smoke process.

Generally, the flame retardants can act chemically in the condensed/gas phase, and/or physically. The mechanism of action includes a chemical effect (i.e., condensed phase). In condensed phase two types of reactions can take place: breakdown of the polymer can be accelerated by flame retardants, which leads to pronounced flow of the polymer which decreases the impact of the flame which breaks away. The flame retardants can cause a layer of carbon (i.e., charring) on the polymer's surface. This phenomenon occurs, for example, through the dehydrating action of the flame retardant generating double bonds in the polymer. These processes form a carbonaceous layer via cyclizing and cross-linking processes cycle.

The additive component of the reinforced polymer-based compound may be a natural fiber (e.g., silk, cotton, jute), which provide satisfactory mechanical properties and renewability, and are more environmentally friendly. Additionally, the additive component of the reinforced polymer-based compound may be nanocomposites. Nano-dispersed montmorillonite clay in the polymer matrix, organo-modified clays, TiO2 nanoparticles, silica nanoparticles, layered double hydroxides, carbon nanotubes, and combinations of nanoparticles with traditional fire retardants (e.g., intumescent) or with surface treatment (e.g., plasma treatment) are among the nanocomposites that can be used as the additive component of the reinforced polymer-based compound.

The additive component of the reinforced polymer-based compound may be an intumescent material (e.g., water-proofed sodium silicate, or graphite). An intumescent is a substance that swells as a result of heat exposure, thus leading to an increase in volume and decrease in density. Intumescents are typically used in passive fire protection and require listing, approval, and compliance in their installed configurations in order to comply with the national building codes and laws. The intumescent material used as the additive of the reinforced polymer-based compound complies with national or international standardization bodies such as, but not limited to, the British Standards Institute (BSI), the German Institute for Standardization (DIN), the American Society for Testing and Materials (ASTM), and the International Standardization Organization (ISO). The intumescent may produce a light char, which is a poor conductor of heat, thus retarding heat transfer. Typically, the light char consists of microporous carbonaceous foam formed by a chemical reaction of three main components: ammonium polyphosphate, pentaerythritol and melamine. The reaction takes place in a matrix formed by the molten binder which is typically based on vinyl acetate copolymers or styrene acrylates.

The intumescent may be an ablative coating which contains a significant amount of hydrates. When the hydrates are heated, the hydrates decompose, and water vapor is released, which has a cooling effect. Once the water is spent, the insulation characteristics of the char that remains can slow down heat transfer from the exposed side to the unexposed side of the reinforced polymer-based compound. Hard chars can be produced with sodium silicates and graphite. Depending on the needs of the equipment located outside and/or inside of the building structure, it is necessary to produce a more substantial char capable of exerting quantifiable expansion pressure. For example, a hydrocarbon fire may be held off with quite potentially more kinetic energy than a house fire. Intumescents that produce hard chars are unsuitable for interior spray fireproofing.

The flame retarding polymers by intumescence is essentially a special case of a condensed phase mechanism which was disclosed above. The activity occurs in the condensed phase and radical trap mechanism in the gaseous phase appears to not be involved. In intumescence, the amount of fuel produced is also greatly diminished and char rather than combustible gases is formed. The intumescent char, however, has a special active role in the process. The intumescent char constitutes a two-way barrier, both for the hindering of the passage of the combustible gases and molten polymer to the flame as well as the shielding of the polymer from the heat of the flame. The intumescent is based on the application of three basic ingredients: 1—a catalyst (acid source), 2—a charring agent and 3—a blowing agent (Spumific).

Additives combining the last three ingredients leading to intumescent effect are commercially available. However, intumescent formulations can simply be developed and are more suitable than some commercial grades for some specific applications. For example, the three ingredients may include any of the following combinations: 1-ammonium salts phosphates, polyphosphates (catalyst), Polyhydric compounds (charring agent), and amines/amides (blowing agents); 2-Sulfates Halides (catalyst), Starch, Dextrin, Sorbitol Pentaerythritol, monomer, dimer, trimer, Phenol-formaldehyde resins, Methylol melamine (charring agents), and Urea, Urea-formaldehyde resins, Dicyandiamide, Melamine, Polyamides (blowing agents).

The flame retardant or their degradation products stop the radical mechanism of the combustion process that takes place in the gas phase. The exothermic processes, which occur in the flame, are thus stopped, the system cools down, the supply of flammable gases is reduced and eventually completely suppressed.

The high-reactive radicals HO. and H. can react in the gas phase with other radicals, such as halogenated radicals X. resulted from flame retardant degradation. Less reactive radicals which decrease the kinetics of the combustion are created.

The additives can form a shield with low thermal conductivity, through an external heat flux, that can reduce the heat transfer deltaH2 (from the heat source to the material). The additive then reduces the degradation rate of the polymer and decreases the "fuel flow" (pyrolysis gases from the degradation of the material) that feeds the flame. Phosphorus additives may act the same way. Their pyrolysis leads to thermally stable pyro- or polyphosphoric compounds which form a protective vitreous barrier. The same mechanism can be observed using boric acid based additives, zinc borates or low melting glasses.

The degradation reactions of the additive can influence the energy balance of combustion. The additive can degrade endothermally which cools the substrate to a temperature which is below the one required for sustaining the combustion process. Different metal hydroxides follow this principle, and its efficiency depends on the amount incorporated in the polymer.

The incorporation of inert substances (e.g., fillers such as talc or chalk) and additives, which evolve as inert gases on decomposition, dilutes the fuel in the solid and gaseous phases so that the lower ignition limit of the gas mixture is not reached.

The flame retardant material may be a melamine-based flame retardants which is cost effectiveness, has low smoke density and toxicity, and has low corrosion. In this family of non-halogenated flame retardants, three chemical groups can be distinguished: 1—Pure melamine, 2—melamine derivatives, i.e., salts with organic or inorganic acids such as boric acid, cyanuric acid, phosphoric acid or pyro/poly-phosphoric acid, and 3—melamine homologues such as melam, melem and melon. Melamine based flame retardants show excellent flame retardant properties and versatility in use because of their ability to employ various modes of flame retardant action.

Flame retardants function by interference with one of the three components that initiate and/or support combustion: heat, fuel and oxygen. In the initial stage melamine can retard ignition by causing a heat sink through endothermic dissociation in case of a melamine salt followed by endothermic sublimation of the melamine itself at roughly 350° C. Another, even larger, heat sink effect is generated by the subsequent decomposition of the melamine vapors.

Melamine can be regarded as a "poor fuel" having a heat of combustion of only 40% of that of hydrocarbons. Furthermore, the nitrogen produced by combustion will act as inert diluent. Another source of inert diluent is the ammonia which is released during breakdown of the melamine or self-condensation of the melamine fraction which does not sublimate.

Melamine can also show considerable contribution to the formation of a char layer in the intumescent process. The char layer acts as a barrier between oxygen and polymeric decomposition gases. Char stability is enhanced by multi-ring structures like melem and melon, formed during self-condensation of melamine. In combination with phosphorous synergists melamine can further increase char stability through formation nitrogen-phosphorous substances. Last but not least melamine can act as blowing agent for the char, enhancing the heat barrier functionality of the char layer.

The flame retardant material may be a silicon-based flame retardant (e.g., polydimethylsiloxane). Low levels of silicon in certain organic polymer systems have been reported to improve their LOI and UL-94 performance. Some compounded silicon (polydimethylsiloxane-type) contains dry powders with a variety of organic plastics. A significant decrease of the rate of release of these materials in comparison with unmodified polyurethanes occurs. The mechanism is as follows: while burning, formation on material surface of a silicon dioxide layer which can act as a thermal insulator and prevents the feedback of energy to the substrate by re-radiating the external heat flux. Silicon-based flame retardants (e.g., polydimethylsiloxane) for polycarbonate (PC) and PC/ABS resins offer both good mechanical properties (strength, moulding) and high flame retardancy performance (UL-94, 1/16 inch V-0 at 10 phr). Linear and branched chain-type silicon with (hydroxy or methoxy) or without (saturated hydrocarbons) functional reactive groups have been evaluated. The silicon, which has a branch chain structure, and which contains aromatic groups in the chain and non-reactive terminal group is very effective.

The additive component of the reinforced polymer-based compound may include an antimicrobial agent. The antimicrobial agent may be an organometallic, an isothazolone, an organosulfur, and a mercaptan. The antimicrobial agent impedes and/or limits the growth of organisms typically encountered in cold and/or wet conditions, including bacteriostatic and fungistatic compounds.

Optionally, the additive component of the reinforced polymer-based compound may include an antioxidant such as a phenolic. The additive component of the reinforced polymer-based compound may include a mold release agent, such as a fine-particle or powdered solid, a soap, a wax, a silicone, a polyglycol and complex ester such as trimethylolpropane tri-stearate or pentaerythritol tetra-stearate. The additive component of the reinforced polymer-based compound may include a heat stabilizer, such as an organotin mercaptide, an octyl ester of thioglycolic acid and a barium or cadmium carboxylate.

The additive component of the reinforced polymer-based compound may include an ultraviolet light stabilizer, such as a hindered amine, a salicylate, a cyanoacrylate, and a nickel chelate.

The equipment located outside and/or inside of the building structure is in the general shape of a square or box shaped or rectangular shaped. The equipment located outside and/or inside of the building structure may have a height in the range of two feet to twelve feet; a width in the range of two feet to twelve feet; and a depth in the range of two feet to twelve feet. As needed, the above height, width and depth ranges of the equipment located outside and/or inside of the building structure may be smaller and/or larger than the above disclosed ranges in order to meet design and demands. However, the shape of the equipment located outside and/or inside of the building structure can be any geometrical or polygonal shape.

Thus, the reinforced polymer-based compound is formed in the general shape of a square or box shaped or rectangular shaped. As an example, the reinforced polymer-based compound may be formed to have a height in the range of two feet to twelve feet; a width in the range of two feet to twelve feet; and a depth in the range of two feet to twelve feet. As needed, the above height, width and depth ranges of reinforced polymer-based compound may be smaller and/or larger than the above disclosed ranges in order to meet design and demands. However, the shape of the reinforced polymer-based compound can be any geometrical or polygonal shape.

The ambient air surrounding the reinforced polymer-based compound usually is in the range of −30° F. to 200° F. in the daytime. Additionally, the ambient air surrounding the reinforced polymer-based compound usually is in the range of 10° F. to 90° F. in the nighttime.

The flame-retardant material is from 0.1% by weight up to 30% by weight of the polymer-based component or HDPE. The intumescent material and/or coating is from 0.1% by weight up to 30% by weight of the polymer-based component or HDPE. The antimicrobial agent is from 0.1% by weight up to 15% by weight of the polymer-based component or HDPE. The ultraviolet light stabilizer is from 0.1% by weight up to 5% by weight of the polymer-based component or HDPE. However, each of the above additive components (i.e. flame-retardant material, intumescent material and/or coating, antimicrobial agent, and ultraviolet light stabilizer) may have a value lower than the above disclosed range or have a value larger than the above disclosed range. If all or more than one of the above additive components are added to the reinforced polymer-based compound or HDPE, then the total additive percentage weight of the additive components should not exceed eighty percent weight of the reinforced polymer-based compound or HDPE.

What is claimed is:
1. A reinforced polymer-based compound, comprising:
   a base component, wherein the base component comprises a high-density polyethylene (HDPE), and
   an additive component as a reinforcing component, wherein the additive component comprises a flame-retardant material, an intumescent material coating, an antimicrobial agent, and an ultraviolet light stabilizer, and wherein the flame-retardant material is from 0.1% by weight up to 30% by weight of the base component, the intumescent material is from 0.1% by weight up to 30% by weight of the base component, the antimicrobial agent is from 0.1% by weight up to 15% by weight of the base component, and the ultraviolet light stabilizer is from 0.1% by weight up to 5% by weight of the base component and wherein the reinforced polymer-based compound is configured to withstand a first temperature range, and wherein the reinforced polymer-based compound is used for fabricating a heat exchanger.

2. The reinforced polymer-based compound according to claim 1, wherein the flame-retardant material comprises at least one selected from the group consisting of: a polyimide, a polybenzoxazole, a polybenzimidazole, and a polybenzthiazole.

3. The reinforced polymer-based compound according to claim 1, wherein the flame-retardant material comprises a first polymer which is resulted from two polymer chains linked with periodic covalent bonds, or a second polymer with a single chain that is double-stranded.

4. The reinforced polymer-based compound according to claim 1, wherein the flame-retardant material comprises an inorganic or a semi-organic polymer.

5. The reinforced polymer-based compound according to claim 4, wherein the flame-retardant material comprises a cyclotriphosphazene ring, or a polysialate.

6. The reinforced polymer-based compound according to claim 1, wherein the flame-retardant material is physically mixed with the base component, wherein the flame-retardant material comprises at least one selected from the group consisting of: an aluminum component, a phosphorus component, a nitrogen component, an antimony component, a chlorine component, a bromine component, a magnesium component, a zinc component, and a carbon component.

7. The reinforced polymer-based compound according to claim 1, wherein the flame-retardant material is chemically built into the reinforced polymer-based compound.

8. The reinforced polymer-based compound according to claim 1, wherein the flame-retardant material comprises a natural fiber.

9. The reinforced polymer-based compound according to claim 1, wherein the flame-retardant material comprises a nanocomposite.

10. The reinforced polymer-based compound according to claim 1, wherein the flame-retardant material comprises at least one selected from the group consisting of: nano-dispersed montmorillonite clays in a polymer matrix of the reinforced polymer-based compound, organo-modified clays, TiO2 nanoparticles, silica nanoparticles, layered double hydroxides, and carbon nanotubes.

11. The reinforced polymer-based compound according to claim 1, wherein the intumescent material coating comprises a microporous carbonaceous foam.

12. The reinforced polymer-based compound according to claim 11, wherein the intumescent material coating is formed by a chemical reaction of ammonium polyphosphate, a pentaerythritol, and a melamine.

13. The reinforced polymer-based compound according to claim 12, wherein for the intumescent material coating, the chemical reaction takes place in a matrix formed by a molten binder.

14. The reinforced polymer-based compound according to claim 13, wherein the molten binder is based at least on: vinyl acetate copolymers, and styrene acrylates.

15. The reinforced polymer-based compound according to claim 1, wherein the antimicrobial agent comprises at least one selected from the group consisting of: an isothazolone, an organosulfur, and a mercaptan.

16. The reinforced polymer-based compound according to claim 1, wherein the ultraviolet light stabilizer comprises at least one selected from the group consisting of: a hindered amine, a salicylate, a cyanoacrylate, and a nickel chelate.

17. The reinforced polymer-based compound according to claim 1, wherein the first temperature range comprises a range from about of −30° F. to about 200° F.

18. A method of fabricating a heat exchanger using the reinforced polymer-based compound of claim 1, comprising a step of coating the heat exchanger that is located outside or inside of a building structure with the reinforced polymer-based compound of claim 1.

19. A method of fabricating a heat exchanger using the reinforced polymer-based compound of claim 1, comprising a step of forming the reinforced polymer-based compound into a geometrical shape based on the shape of the heat exchanger that is located outside or inside of a building structure.

* * * * *